United States Patent [19]

Idesis et al.

[11] Patent Number: 5,535,808
[45] Date of Patent: Jul. 16, 1996

[54] COLLAPSIBLE SUN SHADE FOR VEHICLE WINDOWS

[76] Inventors: Michael Idesis, 10378 Michael Todd 2E, Glenview, Ill. 60025; Boris Guberman, 6535 N. Mozart St. 2, Chicago, Ill. 60645

[21] Appl. No.: 333,724

[22] Filed: Nov. 3, 1994

[51] Int. Cl.$^6$ ........................................ B60J 3/00
[52] U.S. Cl. ................... 160/370.22; 160/238; 160/311; 296/97.7; 296/97.8
[58] Field of Search ................. 160/368.1, 354, 160/370.21, 370.22, 370.23, 84.02, 84.04, 371, 311; 296/97.7, 97.8, 97.9, 138, 152

[56] References Cited

U.S. PATENT DOCUMENTS

| | | | |
|---|---|---|---|
| 2,826,523 | 3/1958 | Blaszkowski et al. | 160/238 X |
| 3,499,680 | 3/1970 | Stroebel | 160/238 X |
| 4,202,396 | 7/1980 | Levy | 160/107 |
| 4,442,881 | 5/1984 | Monteath | 160/25 |
| 4,671,334 | 11/1987 | Yadegar | 160/84 R |
| 4,784,215 | 10/1988 | Sing | 165/41 |
| 5,085,473 | 2/1992 | Yang | 160/370.22 X |
| 5,324,090 | 8/1994 | Lehmhoff | 296/95.1 |

*Primary Examiner*—Blair Johnson
*Attorney, Agent, or Firm*—Don Moyer

[57] ABSTRACT

A sun shade made of a deformable sheet with a deformable air-tight bladder attached along the periphery of the sheet. The sheet has a generally trapezoidal periphery matching the size of vehicle windows. The sheet has a slit along its centerline through which the vehicle rear view mirror is disposed whereupon the slit is closed by slit fasteners to just accommodate the mirror support. When the bladder is inflated by an air pump attached by an air hose to a nozzle sealed into the bladder and a valve on the nozzle is closed, then the sun shade is extended to cover the vehicle window and protect the inside of the vehicle from unwanted light and heat. When the valve on the nozzle is opened and the air pressure is released, then the sun shade is collapsed into a small stow. The extended sun shade is bendable and thus is adaptable to many size windows. The sun shade also has eyelets arrayed along the periphery so that it can be mounted in many ways with common mounting devices.

16 Claims, 2 Drawing Sheets

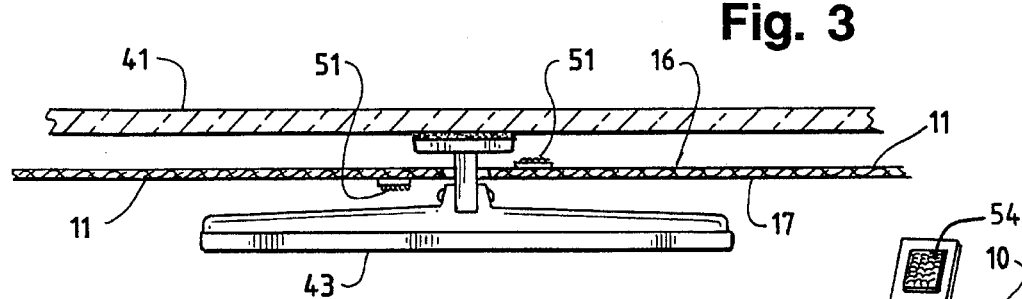
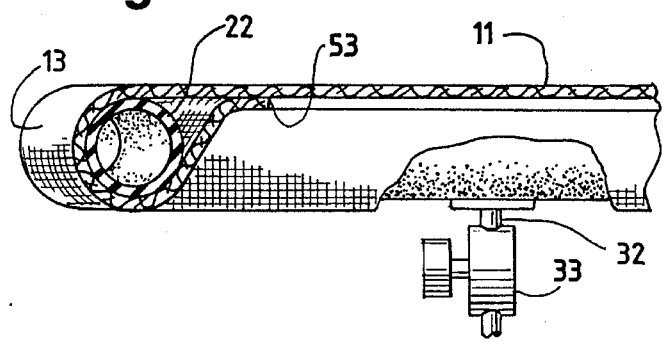
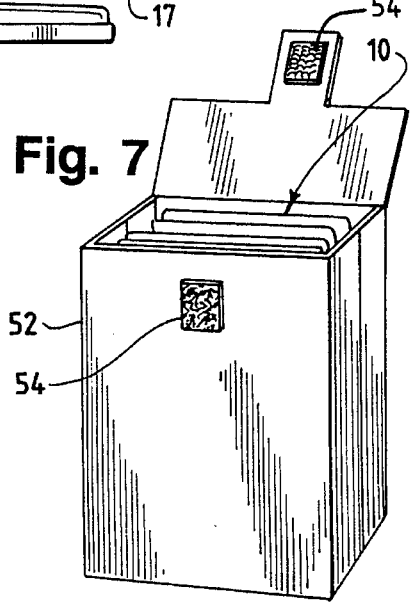
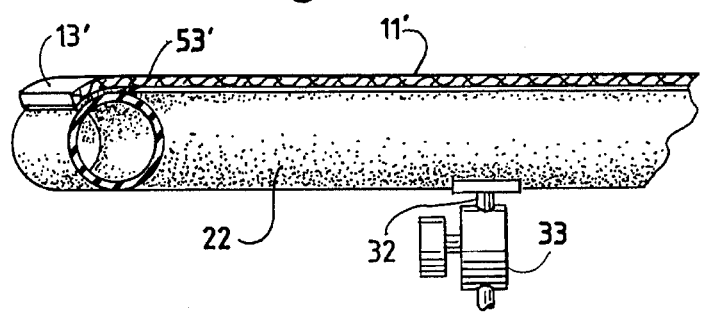
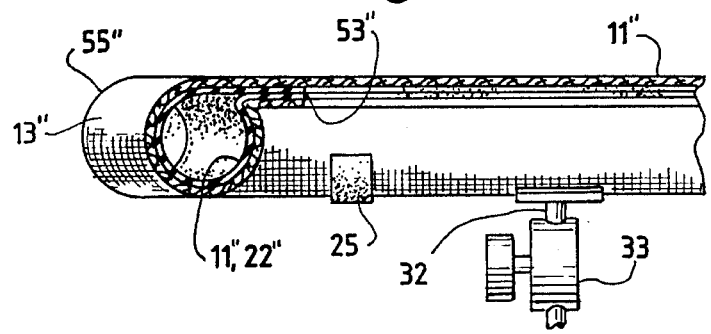

COLLAPSIBLE SUN SHADE FOR VEHICLE WINDOWS

BACKGROUND OF THE INVENTION

This collapsible sun shade for vehicle windows is an invention which relates to sun shades and specifically to sun shades which are disposed on the inside of vehicle windows for protecting the interior of the vehicle from unwanted heat and light.

The invention answers several opportunities for improvement on existing art. For example, the device proposed in U.S. Pat. No. 4,202,396 by A. Levy can be improved by making the sun shade easier to install and remove, making the sun shade more easily adaptable to various sized windows, and making the sun shade collapsible into a small package for easy handling and storage.

The device proposed in U.S. Pat. No. 4,442,881 by D. Monteath and T. B. Watson uses center mounted roller shades so that a sun shade can be more easily installed and removed. However, the ease of use can be still improved further along with the adaptability and the stow size.

The device proposed in U.S. Pat. No. 4,671,334 by G. Yadegar and P. V. Aframian explicitly addresses the issue of closing the sun shade into a smaller package. Nonetheless the stow size can still be improved further along with the ease of use and adaptability.

The device proposed in U.S. Pat. No. 4,784,215 by P. Sing seeks to improve thermal insulation by using pumped air flow through channels in the shade. Even with the slight air pressure entailed in this pumped air flow the Sing patent teaches the need for separate means for shaping, supporting, and mounting the device.

Thus, there are opportunities for improvements in sun shades for vehicle windows by improving stow size, ease of use, and adaptability which are answered by the invention specified here.

SUMMARY OF THE INVENTION

Objects of the invention include the following. First, make a sun shade which is deformable so that it collapses into a small stow, but rigid so that it holds itself against the inside of a vehicle window. Second, use air pressure in an air bladder attached to the periphery of the sun shade to provide the rigidity required to support the sun shade inside a vehicle window. Third, use the air pressure to automatically install the sun shade inside a vehicle window, and use the release of the air pressure to collapse the sun shade to a small stow. Fourth, use the combination of the deformability and the air pressure to allow the sun shade to fit easily a wide range of vehicle windows. And fifth, use eyelets around the periphery to make the sun shade mountable on various windows and to make the sun shade useful in various situations other than inside vehicle windows.

Other objects of this invention will be seen in the detailed description, which will make additional objects obvious to people skilled in the art.

In summary, one embodiment of this invention is a deformable sheet which transmits a low amount of energy of incident sun light, the sheet being generally trapezoidal in shape, the sheet having an air-tight bladder attached around the periphery of the sheet, the sheet having a slit along the centerline axis of symmetry such that a vehicle's rear view mirror fits through the slit thus holding the sheet in place so that when air is pumped into the air-tight bladder the sheet is automatically extended to and held in its generally trapezoidal shape against the vehicle window.

Other embodiments will be seen in the detailed description, which will make additional embodiments obvious to those skilled in the art.

DRAWING FIGURES

FIG. 3 is a partial cross section taken on the line 3—3 in FIG. 1 showing how the sun shade is disposed relative to a vehicle front window and a vehicle rear view mirror.

FIG. 4 is a partial cross section taken on line 4—4 in FIG. 2 showing the preferred embodiment wherein the airtight bladder is contained within a channel formed by the sheet.

FIG. 5 is a partial cross section taken on line 4—4 in FIG. 2 showing a variation wherein the airtight bladder is attached to a variation of the sheet.

FIG. 6 is a partial cross section taken on line 4—4 in FIG. 2 showing a variation wherein the airtight bladder is formed by a variation of the sheet itself.

FIG. 7 shows the sun shade collapsed to a small stow and placed in a small bag.

DETAILED DESCRIPTION OF THE INVENTION

Figure 2:
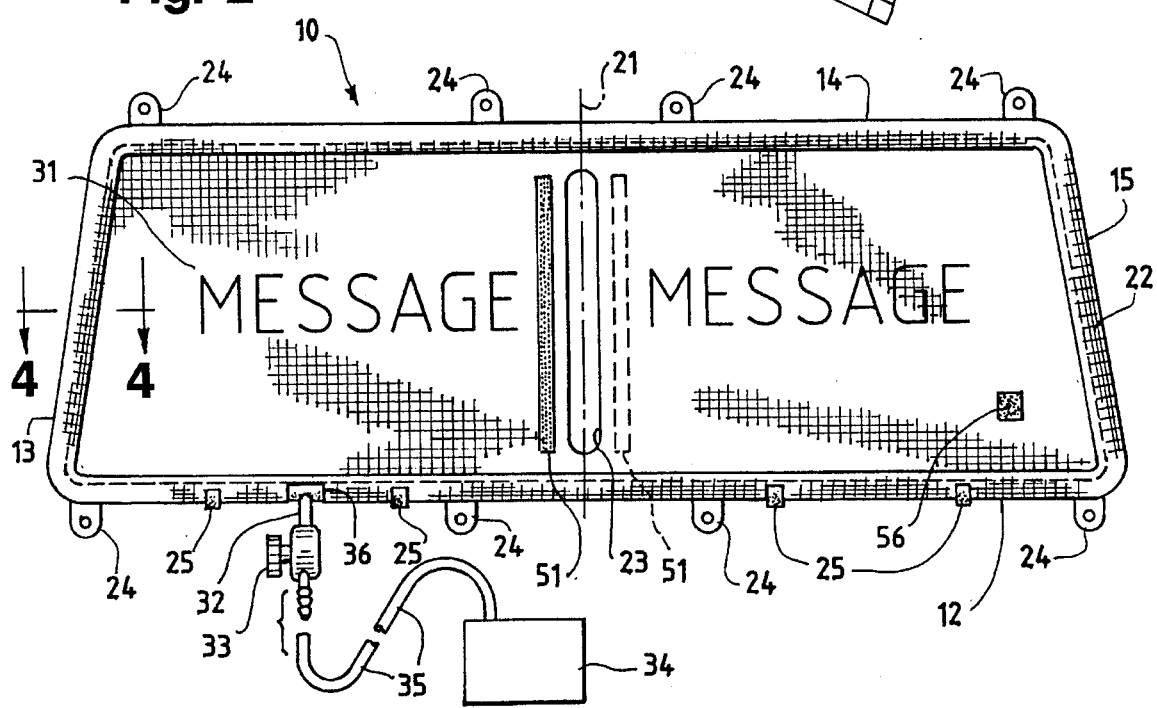
FIG. 2 is a shade-side view of the sun shade extended.

FIG. 2 shows the parts of a collapsible sun shade 10. The body of the sun shade is made of a deformable sheet 11. The periphery of the sheet 12–13–14–15 is of generally trapezoidal shape, with an axis of symmetry about a centerline 21 of the sheet. There is a slit 23 along the centerline, and there is an air-tight bladder 22 attached just inside and along the whole periphery of the sheet. The preferred means for attaching the bladder to the sheet is shown in FIG. 4.

Figure 1:
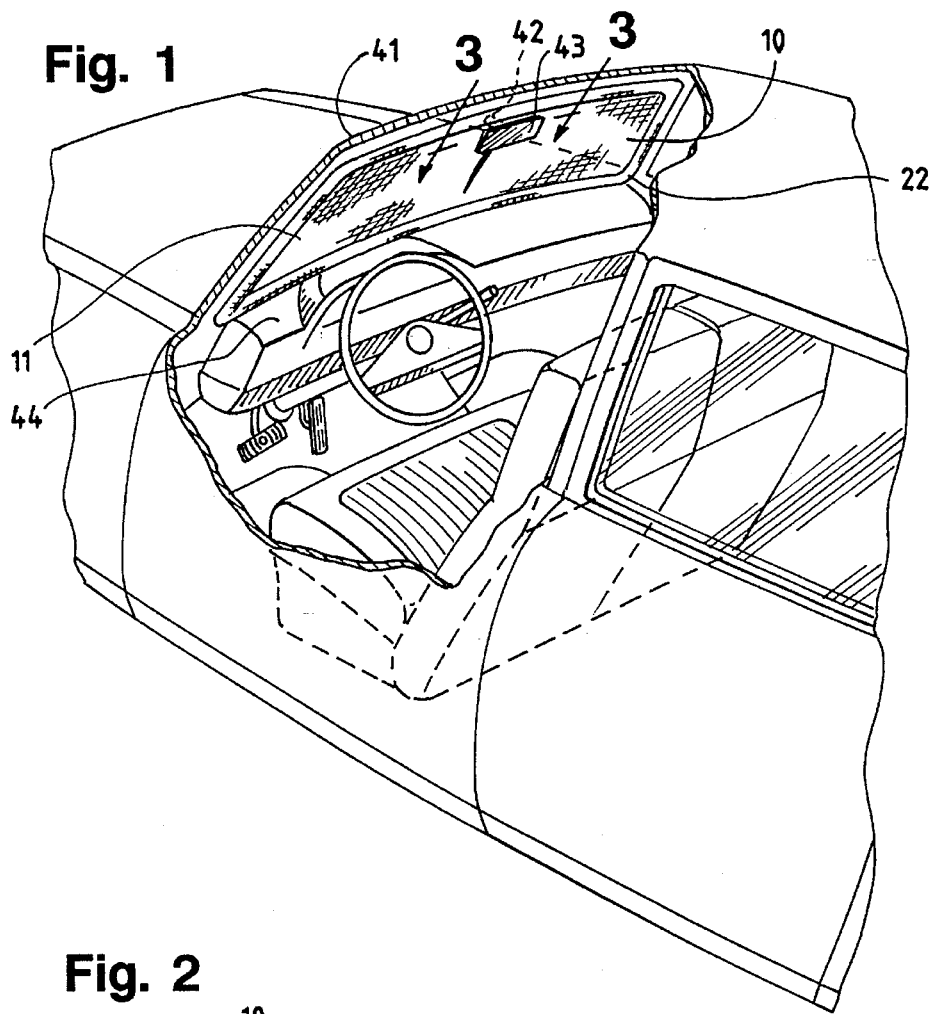
FIG. 1 is a perspective view showing the collapsible sun shade in place in a vehicle window.

FIG. 1 shows the collapsible sun shade 10 in place inside a vehicle front window 41. The vehicle rear view mirror 43 and vehicle rear view mirror support 42 are disposed through the slit 23, and the slit fasteners 51 are closed so that the slit is shortened to just accommodate the mirror support 42. FIG. 3 also shows this disposition of the sun shade, the vehicle front window 41, the rear view mirror 43, and the rear view mirror support 42.

In FIG. 1 and FIG. 2 the air-tight bladder 22, attached just inside the periphery 12–13–14–15 of the shade, has been inflated by the air pump 34 through the air hose 35 and through the nozzle 32 into the bladder, and the valve 33 on the nozzle has been closed. Pumping air into the air-tight bladder automatically extends the deformable sheet 11 to its generally trapezoidal shape to cover the vehicle window. In the preferred embodiment, which fits all automobile front windows now in use, the bottom of the periphery 12 is 56 inches, the top of the periphery 14 is 34 inches, and the sides of the periphery 13 and 15 are both 28 inches, and the corners of this trapezoid can be rounded to inscribed radii as large as 7½ inches. Other variations, such as including a branch of the bladder down along the centerline for added rigidity or curving the sides, will be obvious to people skilled in the art.

If the extended sun shade is larger than some particular vehicle front window, then the sun shade can be bent along the bottom periphery 12 and along the top periphery 14 near the left periphery 13 and near the right periphery 15. The friction strips 25 located along the bottom periphery around the bladder 22, which are tight against the vehicle front window ledge 44, help keep the shade from springing away from the window.

The sheet 11, which forms the body of the collapsible sun shade, and the air-tight bladder 22 are each made of a material which is deformable so that upon opening the valve 33 and releasing the air pressure the sun shade can be collapsed to a small stow and placed inside a small bag 52. FIG. 7 shows the sun shade collapsed and stowed in a small bag which is about one quart in volume.

In the preferred embodiment one half 54 of a bag fastener pair is attached to the top of the small bag and the other half 54 of a bag fastener pair is attached to the side of the small bag so that it can be closed. Also a bag to sheet fastener 56, which is one half of a fastener pair matching one of the halves of the bag fastener pair 54, is attached to the sheet 11 so that the bag can be detachably attached to the extended sun shade so that the bag will not be misplaced. In this embodiment the bag is made out of the same material as the sheet, and the bag fasteners are a loop-and-hook fastener strip pair which are attached to the bag and the sheet by an adhesive. Other variations, such as making the bag an integral part of the sun shade, will be obvious to people skilled in the art. The sheet 11 has a sun-side surface 16 and a shade-side surface 17 as shown in FIG. 3. The material and the construction of the sheet are such that the sheet transmits a low amount of the energy of light incident on the sun-side surface through the shade-side surface. In the preferred embodiment the sheet 11 is fabric. Other materials will be obvious to people skilled in the art.

The bladder which is attached along the periphery of the sheet in the variations shown in FIG. 4, FIG. 5, and FIG. 6, is made of a material which is air-tight to 15 pounds per square inch gauge air pressure. In the preferred embodiment the bladder is made of rubber. Other materials, such as vinyl as is common in inflatable toys, will be obvious to people skilled in the art.

In the preferred embodiment the nozzle 32 into the bladder and the valve 33 on the nozzle are those which are commonly used in beach balls and inflatable toys so that standard pumps and other accessories used with common items can also be used with the sun shade. The valve 33 can be a cap manually placed over the nozzle as is common on inflatable toys. Also in the preferred embodiment the air pump 34 is electrically powered, however other variations such as human lung power are represented by the airpump 34. Many variations of the air hose 35, the air pump 34, the valve 33, and the nozzle 32 will be obvious to people skilled in the art.

In the preferred embodiment the slit fasteners 51 along the slit which allow the length of the slit to be adjusted to just accommodate the vehicle rear view mirror support 42, as shown in FIG. 3, are a loop-and-hook fastener strip pair, and one of the loop-and-hook fastener strip pair is sewn to the sun-side surface of the sheet and the second of the loop-and-hook fastener strip pair is sewn along the shade-side surface of the sheet as shown in FIG. 3 and FIG. 2. Other fasteners and attachments will be obvious to people skilled in the art.

FIG. 4, FIG. 5, and FIG. 6 show three variations for attaching the air-tight bladder along the periphery of the sheet. In FIG. 5 the air-tight bladder 22 is attached to the sheet, just inside the periphery 13' of the sheet 11', by an adhesive seal 53'.

In FIG. 4, which is the preferred embodiment, the bladder 22 is contained within a channel 55 formed by turning the material of the sheet back on itself along the periphery and sewing the sheet to itself at the seal 53. In this case there is a nozzle slot 36 in a portion of the sheet forming the channel 55, the nozzle slot providing access to the nozzle 32 into the bladder 22. In the preferred embodiment the cross section of the bladder is about one inch in diameter, though this is not a critical factor. Other variations, such as making the channel by attaching a strip of material onto the sun shade, will be obvious to people skilled in the art.

In FIG. 6 the air-tight bladder 22" just inside the periphery 13" of the sheet 11' is the channel 55' formed by turning the material of the sheet back on itself along the periphery and sealing the sheet to itself with an adhesive 53". In this case the material of the part of the sheet forming the channel 55", which is now itself the bladder 22", and the adhesive seal 53" are both air-tight to 15 pounds per square inch gauge air pressure.

FIG. 6 also shows where the friction strips 25 are attached around the bladder at the periphery by an adhesive. Other ways to attach the friction strips, and to attach the air-tight bladder, will be obvious to people skilled in the art.

In the preferred embodiment written and graphic messages are reproduced on the sun-side surface and on the shade-side surface of the sheet, as indicated at 31 in FIG. 2, making the sun-shade an attractive item for commercial advertising.

In the preferred embodiment eyelets 24 are arrayed along the periphery of the sheet so that the sheet can be attached to various vehicle windows and to other windows. In FIG. 2 the eyelets 24 are shown in an exaggerated ear format. Other variations will be obvious to people skilled in the art.

In the preferred embodiment the sun shade fits automobile front windows. Since this sun shade is rigid and bendable, it can be used on the other automobile windows and can be used on other vehicle windows. For example, commonly available suction cups with attached hooks, or "S-hooks," or other common devices can be used to hang this sun shade by its eyelets. This collapsible sun shade can be used wherever it is desired to protect a place from unwanted sun light and heat. This shade can even be used to shelter a place from unwanted wind. In another variation this device could be used to reflect sun light where sun light is wanted. Many variations for using and constructing this collapsible sun shade will be obvious to people skilled in the art. It is understood therefore that this invention is not limited to the particular embodiments disclosed here.

We claim:

1. A collapsible sun shade comprising:

a sheet, the sheet being deformable, the sheet having a periphery, the sheet having a sun-side surface and a shade-side surface, the sheet transmitting a low amount of energy of sun light incident on the sun-side surface through the shade-side surface, the periphery including a bottom side, a left side, a top side, and a right side, the periphery being generally trapezoidal in shape with the top side being generally parallel to and shorter than the bottom side, the periphery being symmetric about a centerline which bisects and is perpendicular to the top side and which bisects and is perpendicular to the bottom side, and the periphery being generally the size of a vehicle front window; and, an air-tight bladder attached around the periphery of the sheet, the bladder being deformable, and the bladder having a nozzle sealed into the bladder for inflating the bladder by an air-pump connected to the nozzle, the nozzle having a valve integral with the nozzle for sealing the inflated bladder so that the sealed, inflated bladder and the sheet form a rigid but bendable planar screen independent of any other structure, and upon opening the valve, for deflating the bladder and collapsing the sheet with attached bladder into a small stow.

2. The collapsible sun shade of claim 1 further comprising friction strips arrayed along the bottom side of the periphery of the sheet, each friction strip partially encircling the bladder, the friction strips for contacting a vehicle front window ledge in order to keep the extended sun shade from springing away from the vehicle front window.

3. The collapsible sun shade Of claim 1 further comprising a slit along the centerline, the slit starting at the centerline below where the bladder is attached to the top side of the periphery and the slit extending along the centerline to above where the bladder is attached to the bottom side of the periphery, the slit for disposing the sun-side surface of the sun shade against a vehicle window with a vehicle rear view mirror and a vehicle rear view mirror support disposed through the slit.

4. The collapsible sun shade of claim 3 further comprising slit fasteners attached to the sheet along the slit for adjusting the length of the slit to just accommodate the vehicle rear view mirror support.

5. The collapsible sun shade of claim 4 wherein the slit fasteners are a loop-and-hook fastener strip pair.

6. The collapsible sun shade of claim 1 further comprising a bag for stowing the collapsed sun shade.

7. The collapsible sun shade of claim 6 further comprising a first bag fastener attached to the bag and a second bag fastener attached to the bag for closing the bag, and a third bag fastener attached to the sheet for detachably attaching the bag to the extended sun shade and keeping the bag from being misplaced while the sun shade is in use.

8. The collapsible sun shade of claim 7 wherein the first bag fastener is one of a loop-and-hook fastener strip pair, the second bag fastener is the second of the loop-and-hook fastener strip pair, and the third bag fastener is one of a loop-and-hook fastener strip pair.

9. The collapsible sun shade of claim 1 wherein the air-tight bladder is a channel around the periphery of the sheet, the channel being formed by turning the sheet back on itself and sealing the sheet to itself by a seal, the channel and the seal being air-tight.

10. The collapsible sun shade of claim 1 wherein the air-tight bladder is contained within a channel around the periphery of the sheet, the channel being formed by turning the sheet back on itself and sealing the sheet to itself by a seal, the channel having a nozzle slot integral with the channel for accessing the nozzle sealed into the air-tight bladder.

11. The collapsible sun shade of claim 1 further comprising at least one message reproduced on the sun-side surface of the sheet.

12. The collapsible sun shade of claim 1 further comprising at least one message reproduced on the shade-side surface of the sheet.

13. The collapsible sun shade of claim 1 further comprising eyelets arrayed along the periphery of the sheet.

14. A collapsible sun shade comprising:

a sheet, the sheet being deformable, the sheet having a periphery; and, an air-tight bladder attached around the periphery of the sheet, the bladder being deformable, and the bladder having a nozzle sealed into the bladder for inflating the bladder by an air-pump connected to the nozzle, the nozzle having a valve integral with the nozzle for sealing the inflated bladder so that the sealed, inflated bladder and the sheet form a rigid but bendable planar screen independent of any other structure, and upon opening the valve, for deflating the bladder and collapsing the sheet with attached bladder into a small stow.

15. The collapsible sun shade of claim 14 wherein the air-tight bladder is a channel around the periphery of the sheet, the channel being formed by turning the sheet back on itself and sealing the sheet to itself by a seal, the channel and the seal being air-tight.

16. The collapsible sun shade of claim 14 wherein the air-tight bladder is contained within a channel around the periphery of the sheet, the channel being formed by turning the sheet back on itself and sealing the sheet to itself by a seal, the channel having a nozzle slot integral with the channel for accessing the nozzle sealed into the air-tight bladder.

* * * * *